(12) United States Patent
Bernstein et al.

(10) Patent No.: US 7,437,686 B1
(45) Date of Patent: Oct. 14, 2008

(54) SYSTEMS, METHODS AND COMPUTER PROGRAM PRODUCTS FOR GRAPHICAL USER INTERFACE PRESENTATION TO IMPLEMENT FILTERING OF A LARGE UNBOUNDED HIERARCHY TO AVOID REPETITIVE NAVIGATION

(75) Inventors: Howard B. Bernstein, Lexington, MA (US); Adrien Bisson, Westford, MA (US); Eleonora Ludin, Newton, MA (US); Mia Stern, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/941,565

(22) Filed: Nov. 16, 2007

(51) Int. Cl.
*G06F 3/048* (2006.01)
(52) U.S. Cl. .................... 715/853; 715/854
(58) Field of Classification Search .......... 715/853, 715/854
See application file for complete search history.

(56) References Cited

U.S. PATENT DOCUMENTS

| | | | | |
|---|---|---|---|---|
| 5,644,736 | A * | 7/1997 | Healy et al. | 715/784 |
| 5,812,135 | A * | 9/1998 | Kotchey | 715/853 |
| 5,917,492 | A * | 6/1999 | Bereiter et al. | 715/854 |
| 6,055,515 | A * | 4/2000 | Consentino et al. | 705/27 |
| 6,115,044 | A * | 9/2000 | Alimpich et al. | 715/855 |
| 6,236,400 | B1 * | 5/2001 | Guerrero | 715/841 |
| 6,271,846 | B1 * | 8/2001 | Martinez et al. | 715/854 |
| 6,341,280 | B1 * | 1/2002 | Glass et al. | 707/3 |
| 6,348,935 | B1 * | 2/2002 | Malacinski et al. | 715/853 |
| 6,380,957 | B1 * | 4/2002 | Banning | 715/828 |
| 6,484,190 | B1 * | 11/2002 | Cordes et al. | 715/207 |
| 6,879,988 | B2 * | 4/2005 | Basin et al. | 707/200 |
| 7,028,043 | B2 | 4/2006 | Bleizeffer et al. | |
| 7,209,914 | B2 * | 4/2007 | Van Heghe et al. | 707/3 |
| 7,334,196 | B2 * | 2/2008 | Suppan et al. | 715/853 |
| 7,353,464 | B1 * | 4/2008 | Kundu et al. | 715/853 |
| 2002/0196293 | A1 * | 12/2002 | Suppan et al. | 345/853 |
| 2003/0033267 | A1 * | 2/2003 | Bleizeffer et al. | 707/1 |
| 2003/0081013 | A1 * | 5/2003 | Allen et al. | 345/853 |
| 2003/0105771 | A1 * | 6/2003 | Tiefenbrun et al. | 707/103 R |
| 2004/0189707 | A1 * | 9/2004 | Moore et al. | 345/777 |
| 2004/0199539 | A1 * | 10/2004 | Richardson et al. | 707/102 |
| 2004/0205711 | A1 * | 10/2004 | Ishimitsu et al. | 717/116 |
| 2004/0239683 | A1 * | 12/2004 | Chu et al. | 345/619 |
| 2005/0044100 | A1 * | 2/2005 | Hooper et al. | 707/102 |

(Continued)

*Primary Examiner*—Weilun Lo
*Assistant Examiner*—Tuyetlien T Tran
(74) *Attorney, Agent, or Firm*—Cantor Colburn LLP; Paul Coryea (57) ABSTRACT

Systems, methods, and computer program products for graphical user interface presentation to implement filtering of a large unbounded hierarchy. Exemplary embodiments include a method including retrieving the file hierarchy tree for presentation on the display, the file hierarchy tree representative of a plurality of nodes, navigating the file hierarchy tree to identify nodes for selection in a sub-group of nodes, receiving a node selection signal, presenting the selected node with a highlight on the display, receiving a menu selection signal, displaying a menu on the display including an option to create a filter, receiving a filter creation selection signal, displaying a popup dialog box on the display, the popup dialog box including an option to create a new filter and edit an existing filter, receiving a dialog box selection signal and displaying a filtered hierarchy tree on the display, the filtered hierarchy tree including the sub-group of nodes.

1 Claim, 11 Drawing Sheets

U.S. PATENT DOCUMENTS

2005/0240881 A1* 10/2005 Rush et al. .................. 715/851
2006/0005124 A1* 1/2006 Speicher .................... 715/514
2006/0047673 A1* 3/2006 Molander et al. ........... 707/101
2006/0242121 A1* 10/2006 DeVorchik et al. ............. 707/3
2007/0006038 A1* 1/2007 Zhou .......................... 714/38
2007/0083456 A1* 4/2007 Akers ......................... 705/37

* cited by examiner

SYSTEMS, METHODS AND COMPUTER PROGRAM PRODUCTS FOR GRAPHICAL USER INTERFACE PRESENTATION TO IMPLEMENT FILTERING OF A LARGE UNBOUNDED HIERARCHY TO AVOID REPETITIVE NAVIGATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to file system presentations, and particularly to systems, methods, and computer program products for graphical user interface presentation to implement filtering of a large unbounded hierarchy to avoid repetitive navigation.

2. Description of Background

In file system presentations there are mechanisms that allow the user to create shortcuts using the functionality of the system e.g. links, or create shortcuts in the presentation layer to go directly to one of the branches of the hierarchy. In database systems filtering is typically accomplished by writing some SQL, or interacting with some dialog interface to filter the data returned, which in turn modifies a query. For example, a user must interact with a dialog. navigate and reproduce the view they already have in their tree display to create a filter, which is exactly the problem that creating a filter should address.

When navigating large databases of hierarchical information, users must often traverse though multiple levels of the hierarchy to navigate to the location in the hierarchy in which they have an interest. Systems that do not persist the expansion of the hierarchy from one session to the next require that the user perform this navigation in any new session where they want to navigate to the same location. Systems that do persist the expansion do so at the expense of recreating the expansion automatically and filling the user interface with the hierarchy above the location of interest. In either approach, the representation of the hierarchy is complete from the root of the hierarchy down to the location of interest, often forcing the user to see a large amount of extraneous information.

There are many kinds of filtering mechanisms available in products available in the marketplace. For example, type based filters allow the user to pick from a list of object types they either want to include or exclude in the hierarchical display. Some filtering mechanisms allow the user to specify a logical expression that includes one or more properties of an object, and include or exclude objects where the expressions match. The Eclipse framework includes a mechanism called "Working Sets" that allows the user to arbitrarily choose nodes in the hierarchy to include in a named working set, and then specify which working set is visible in the hierarchy at any given time. In the Eclipse approach, the user must find the objects of interest in a popup dialog rather than immediately in the view they are operating in, and the resulting filtered view includes all objects between the selected objects and the root.

SUMMARY OF THE INVENTION

Exemplary embodiments include a method of graphical user interface presentation to implement filtering of the file hierarchy tree, the method including retrieving the file hierarchy tree for presentation on the display, the file hierarchy tree representative of a plurality of nodes, navigating the file hierarchy tree to identify nodes for selection in a sub-group of nodes, for each of the sub-group of nodes of the plurality of nodes, receiving a node selection signal indicative of the selection device pointing on a selected node from the file hierarchy tree, in response to the node selection signal, presenting the selected node with a highlight on the display, receiving a menu selection signal indicative of the selection device pointing at one of the sub-group of nodes, in response to the menu selection signal, displaying a menu on the display including an option to create a filter, receiving a filter creation selection signal indicative of the selection device pointing at the option to create the filter, in response to receiving the filter creation signal, displaying a popup dialog box on the display, the popup dialog box including an option to create a new filter and edit an existing filter, receiving a dialog box selection signal indicative of the selection device pointing at a selection button on the dialog box and displaying a filtered hierarchy tree on the display, the filtered hierarchy tree including the sub-group of nodes. The method can further include in response to the dialog box selection signal, receiving a new filter name when a create a new filter selection signal is received with the dialog box selection signal. The method can further include in response to the dialog box selection signal, receiving an existing filter name, and a modified sub-group of nodes when an edit an existing filter selection signal is received with the dialog box selection signal.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which provides systems and methods that enable the user to select as many nodes in the hierarchy as they want, and then gesture to create a filtered view that shows only those nodes they selected at the root of the tree. In creating the filter, the user names the filter so that they may reuse it in the future. The user may switch between filters, and between filtered and unfiltered views of the data.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In exemplary embodiments, the systems and methods described herein, the user can specify a filter by using the representation of the hierarchy that the user has been navigating, and can present the filtered objects as new root objects such that the user is not exposed to extraneous hierarchical objects between the objects of interest and the root object. In exemplary embodiments, specifying a filter is faster and requires many fewer mouse clicks, and the resulting filtered view is void of extraneous nodes, thereby simplifying interaction.

Figure 1:
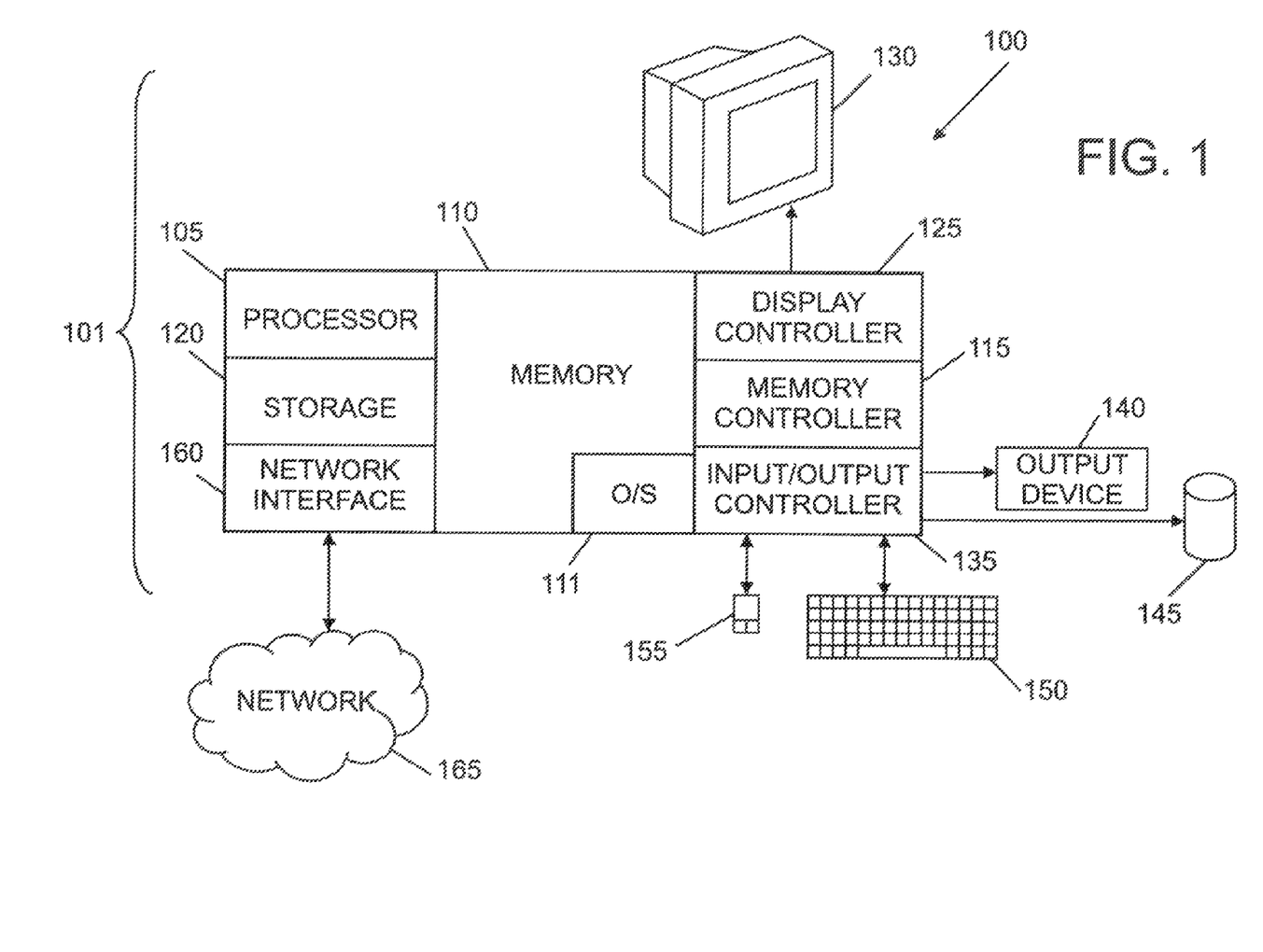
FIG. 1 illustrates an exemplary embodiment of a system for graphical user interface presentation to implement filtering of a large unbounded hierarchy to avoid repetitive navigation.

FIG. 1 illustrates an exemplary embodiment of a system 100 for graphical user interface presentation to implement filtering of a large unbounded hierarchy to avoid repetitive navigation. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 101, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the graphical user interface presentation methods described herein in accordance with exemplary embodiments and a suitable operating system (OS) 111. The operating system 111 essentially controls the execution of other computer programs, such the graphical user interface presentation systems and methods described herein, and provides scheduling, input-output control, file and data management, memory management, and communication control and related services.

The graphical user interface presentation methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the graphical user interface presentation methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 110 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The graphical user interface presentation methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The graphical user interface presentation methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the graphical user interface presentation methods are implemented in hardware, the graphical user interface presentation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, one or more processes in the memory 110 can monitor activity from the keyboard 150 and the mouse 155 or a combination thereof. The processes can further monitor long-running jobs that have been initiated on the computer 101. The processes can further monitor which and how many other machines can control the computer 101 either locally or remotely. In exemplary embodiments, the processes can also inquire or accept a grace period input by a user of the computer 101. The grace period can be a time period after which all traffic to and from the computer ceases if no further activity has been sensed by the processes. In this way, if a user has left the computer 101 for an extended period of time or has left the computer (e.g., after a work day) the computer 101 no longer allows traffic to and from the computer 101. In an alternative implementation, the computer 101 can totally power down after the grace period has expired. In further exemplary embodiments, the processes can accept traffic only from a common network maintenance control system that provides limited services.

In exemplary embodiments, the user can interact directly with the presentation they are using to create the filter. In exemplary embodiments, the user has already navigated through the hierarchy and does not want to repeat the navigation. The systems and methods described herein enable the user to select as many nodes in the hierarchy as they want, and then gesture to create a filtered view that shows only those nodes they selected at the root of the tree. In creating the filter, the user names the filter so that they may reuse it in the future. The user may switch between filters, and between filtered and unfiltered views of the data.

Figures 2, 2A:
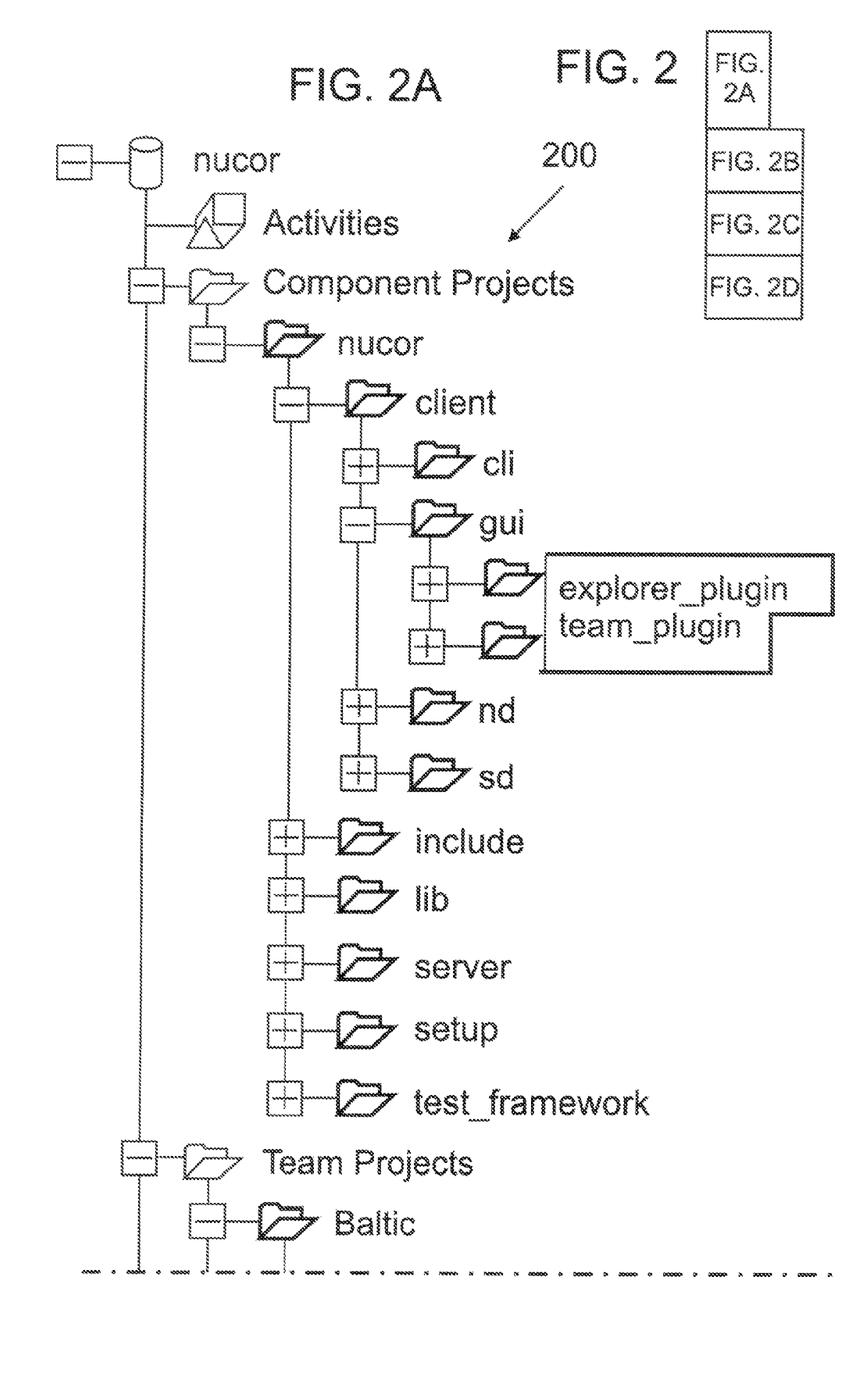
FIG. 2 illustrates an exemplary file hierarchy tree.
Figure 2B:
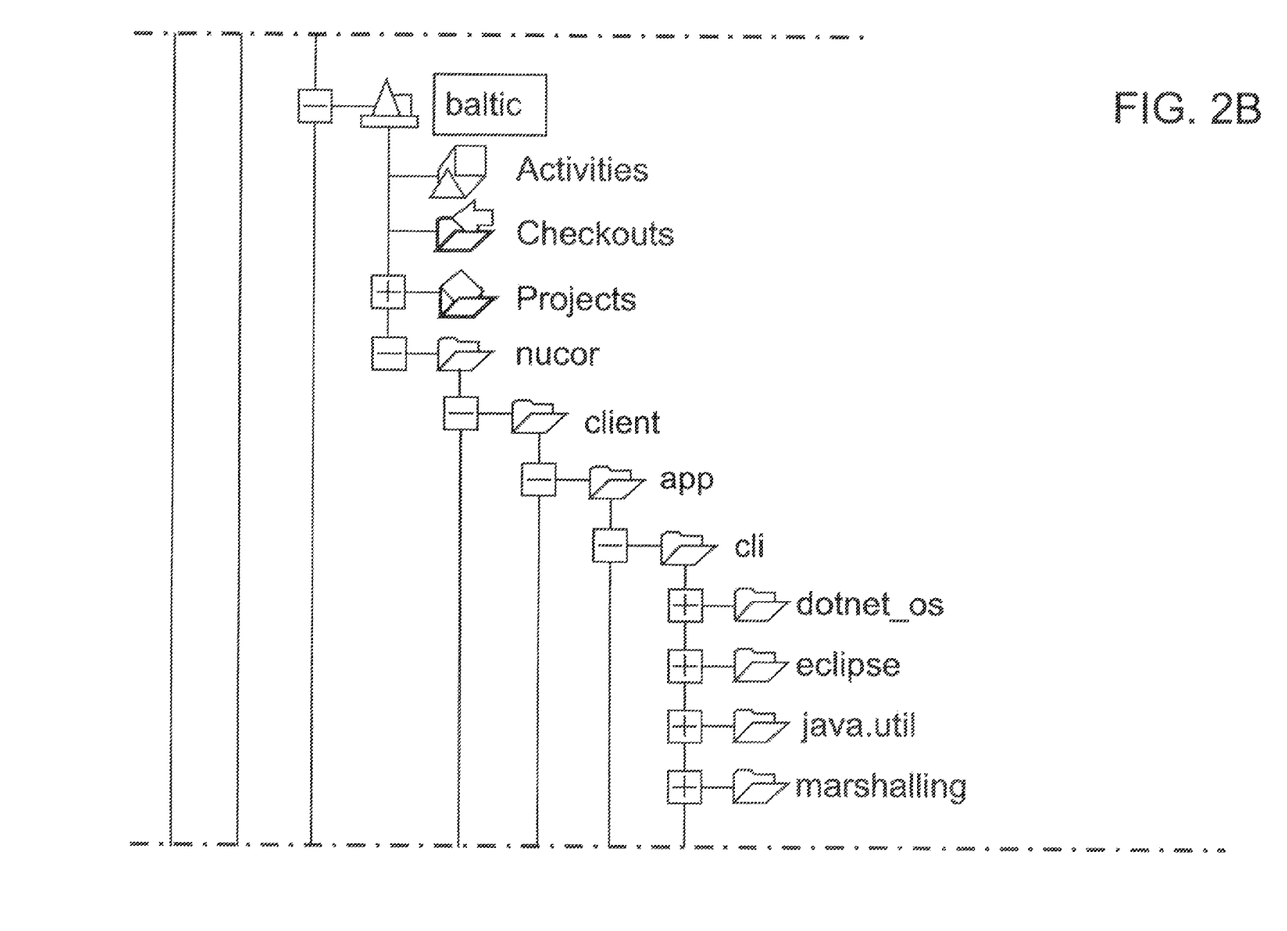
Figure 2C:
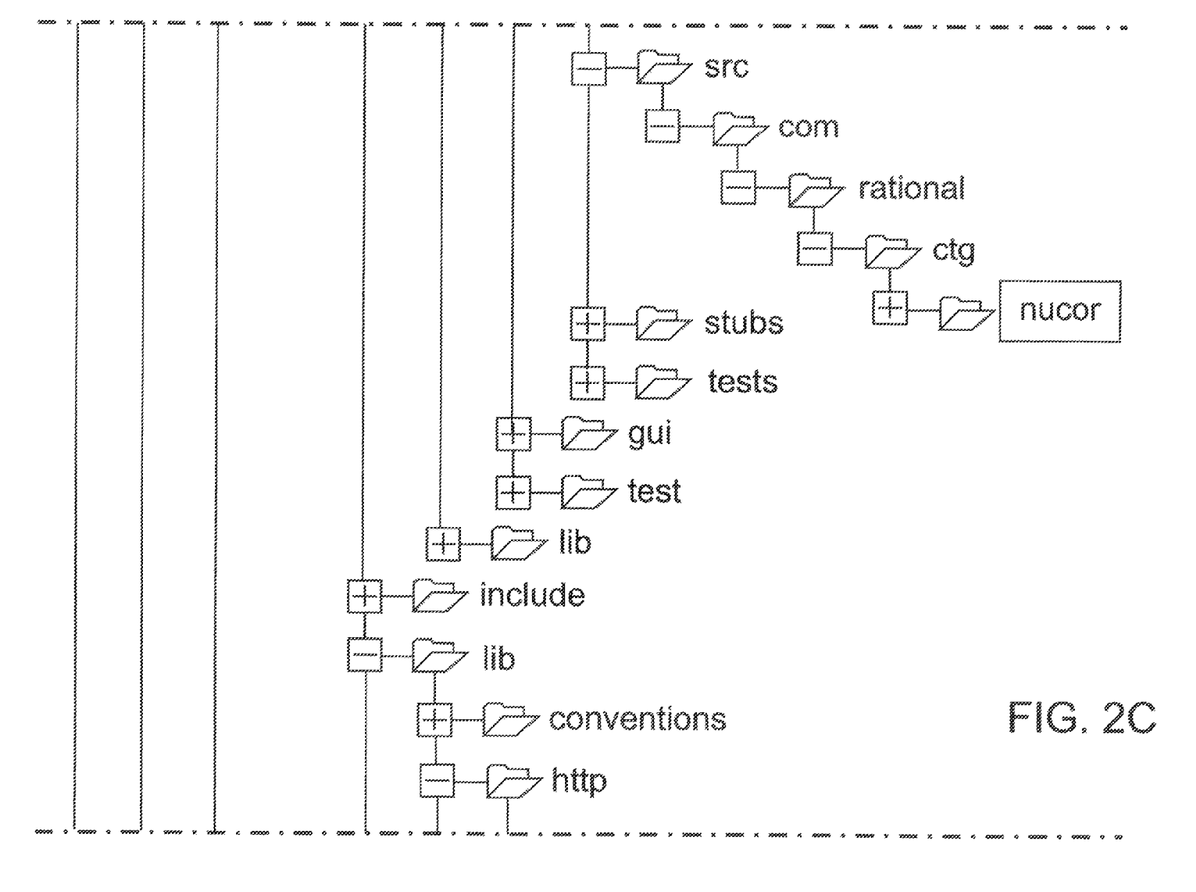
Figure 2D:
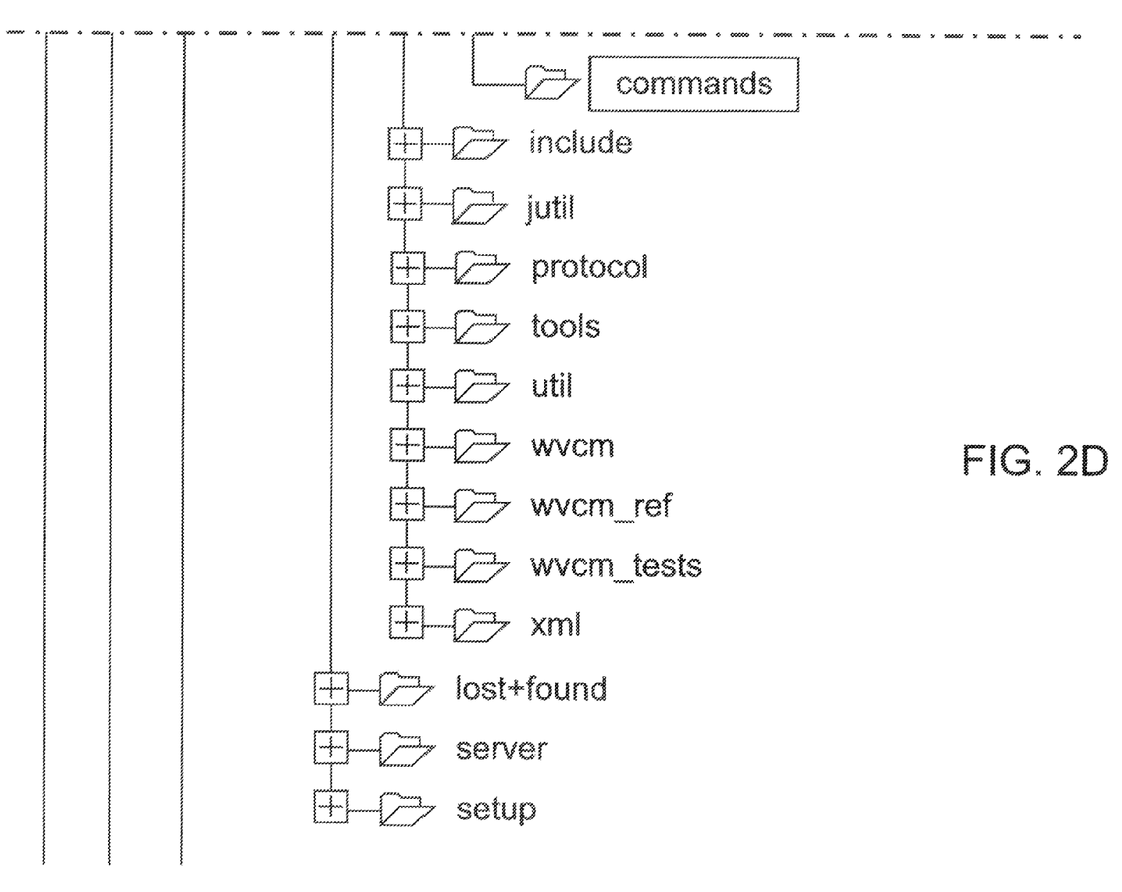
Figures 3, 3A:
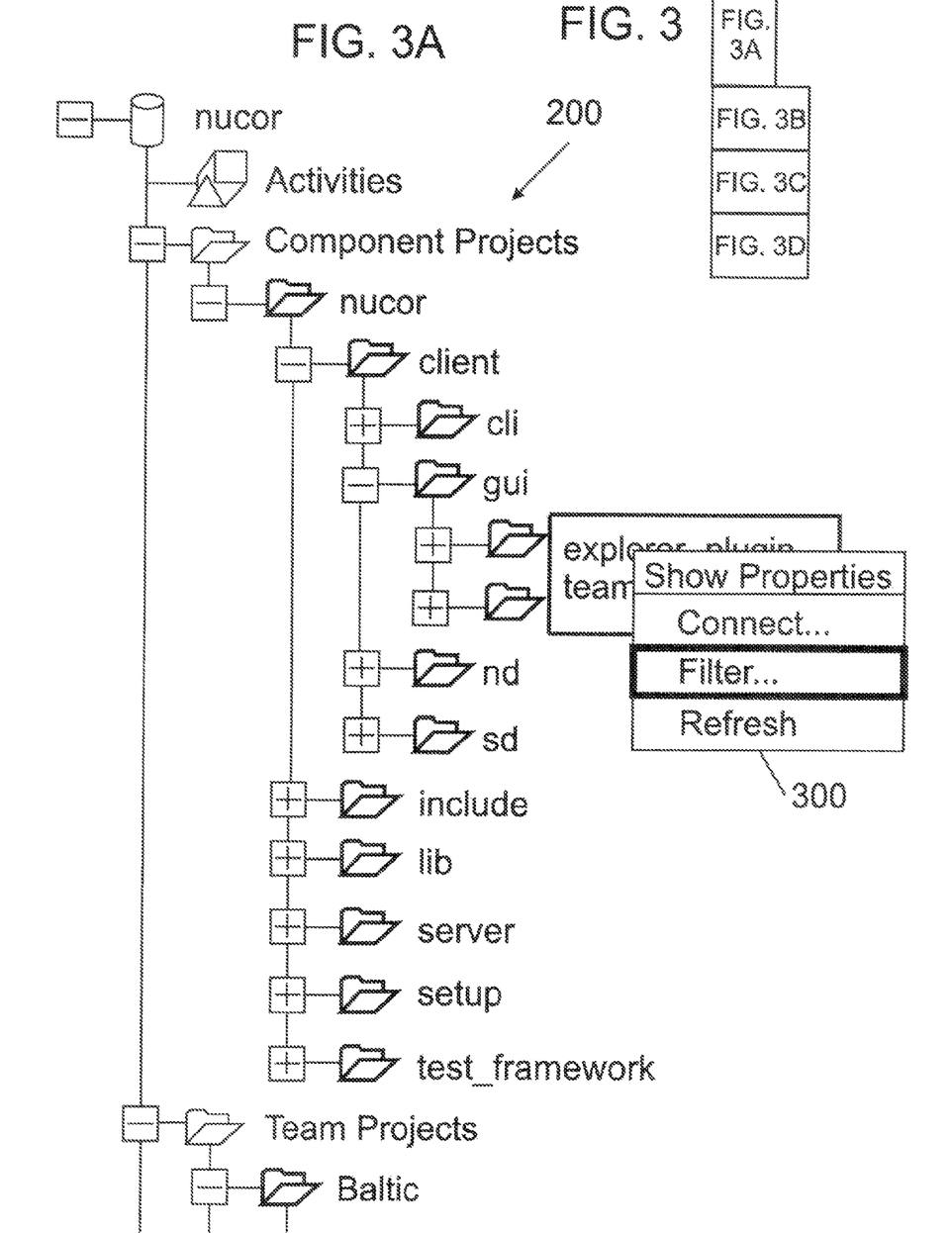
FIG. 3 illustrates the file hierarchy tree of FIG. 2 in which the user has selected a "Filter . . ." command in accordance with exemplary embodiments.
Figure 3B:
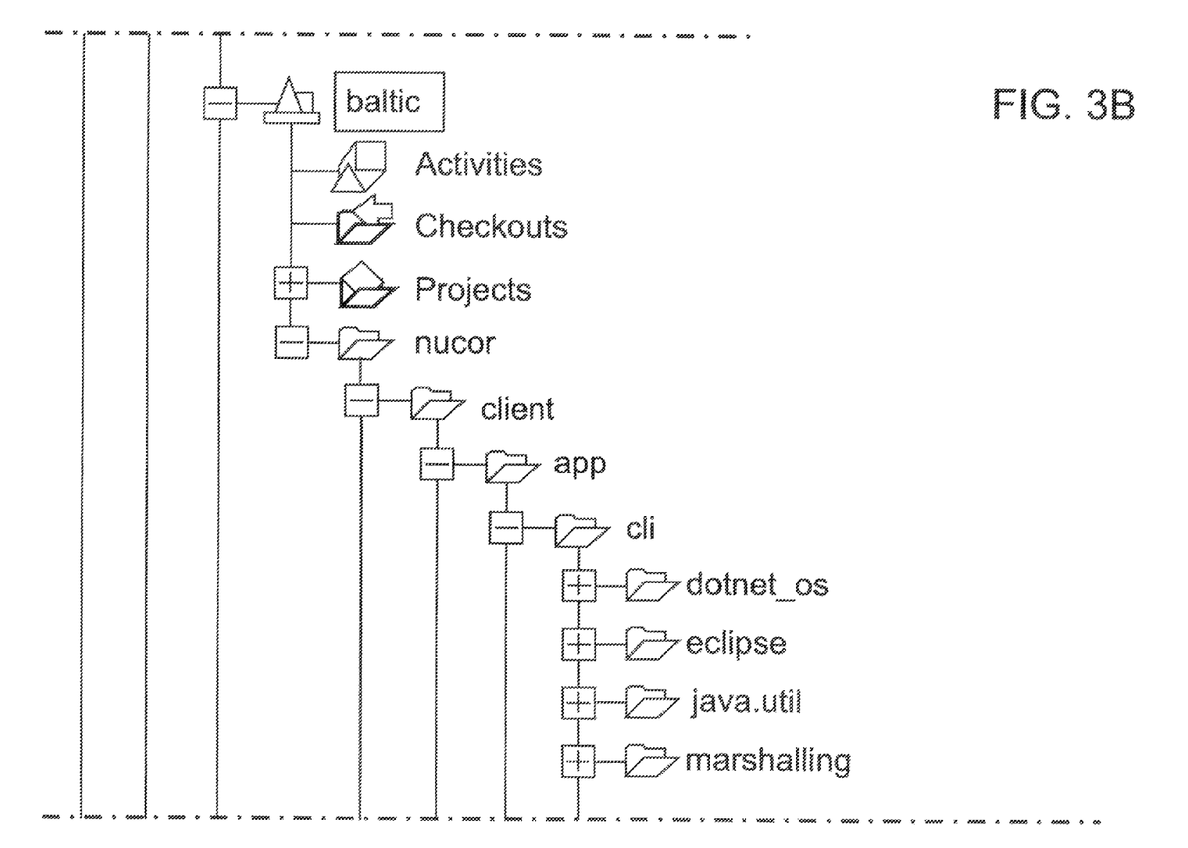
Figure 3C:
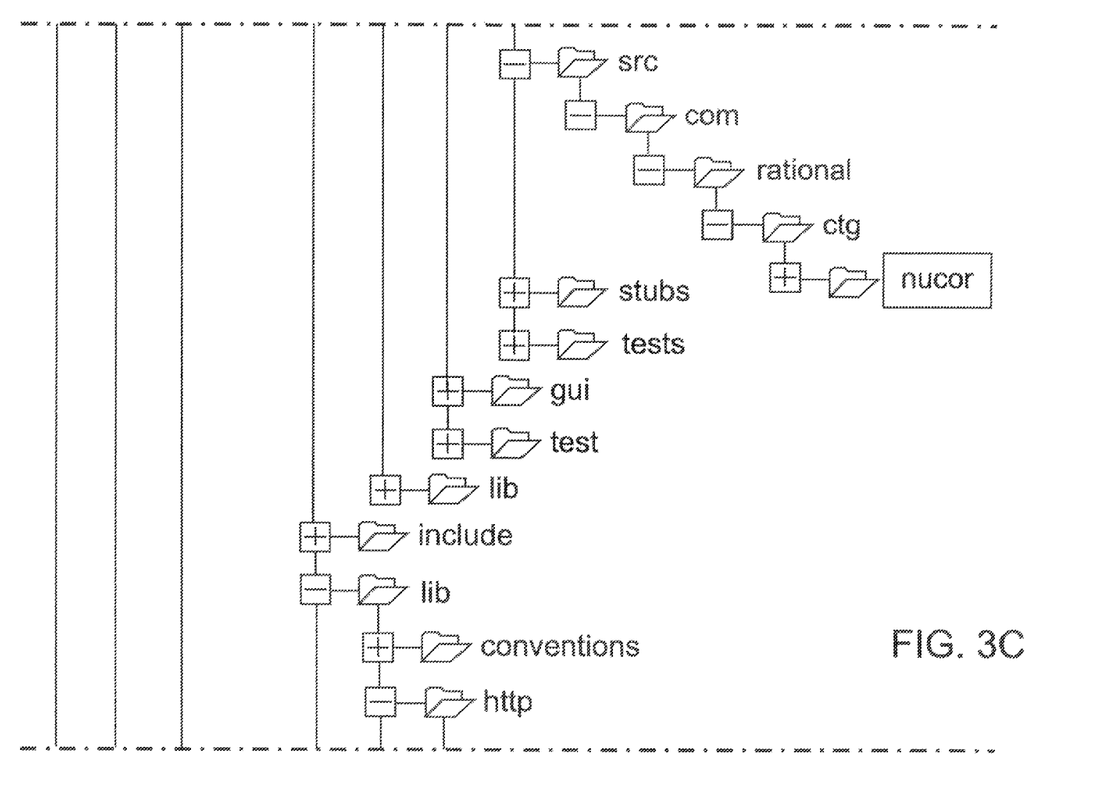
Figure 3D:
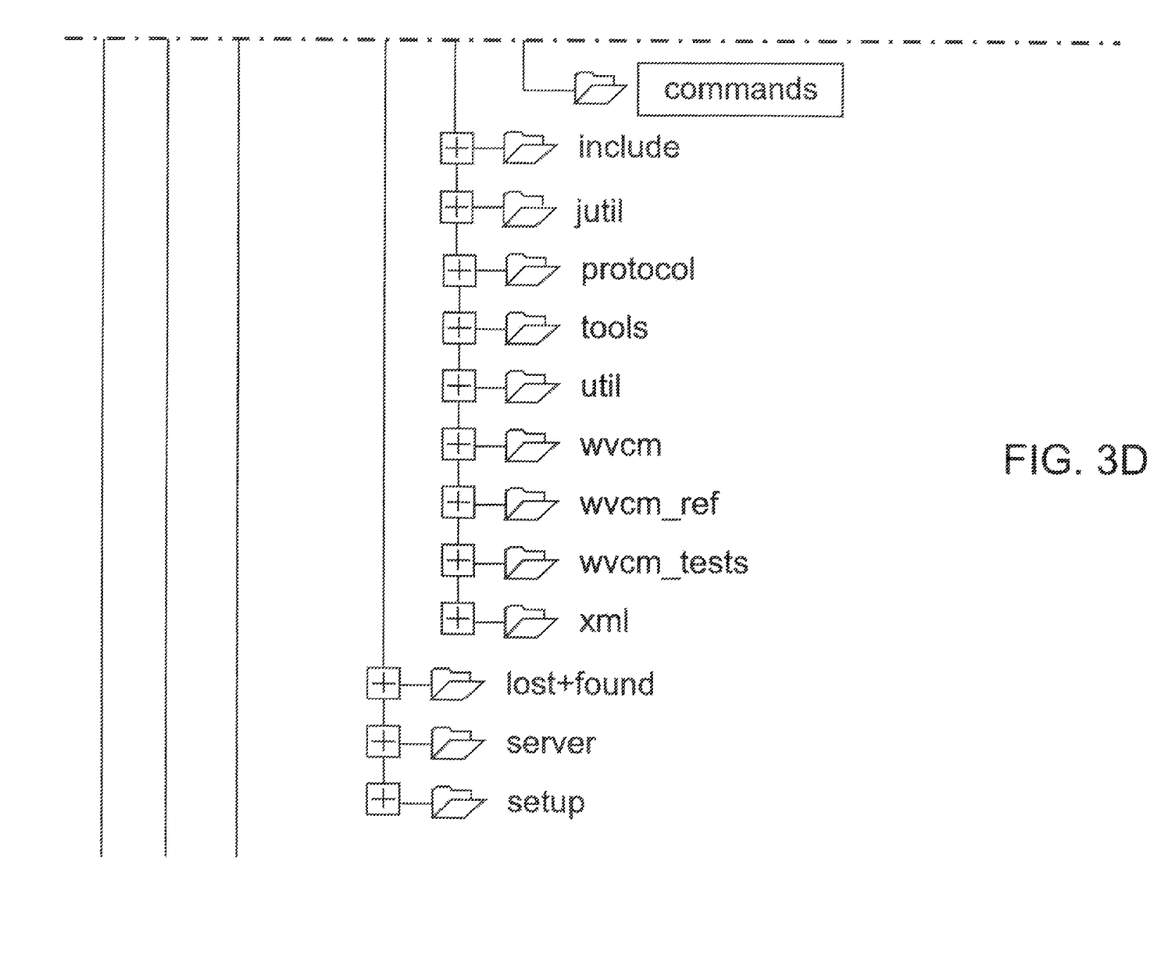
Figure 4:
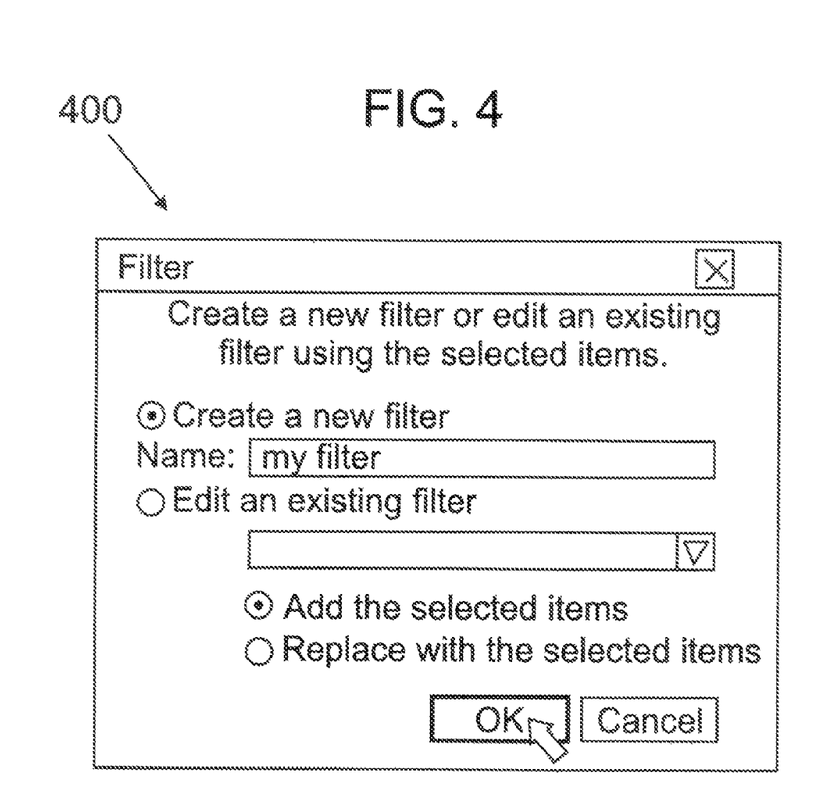
FIG. 4 illustrates an exemplary popup dialog in accordance with exemplary embodiments.
Figure 5:
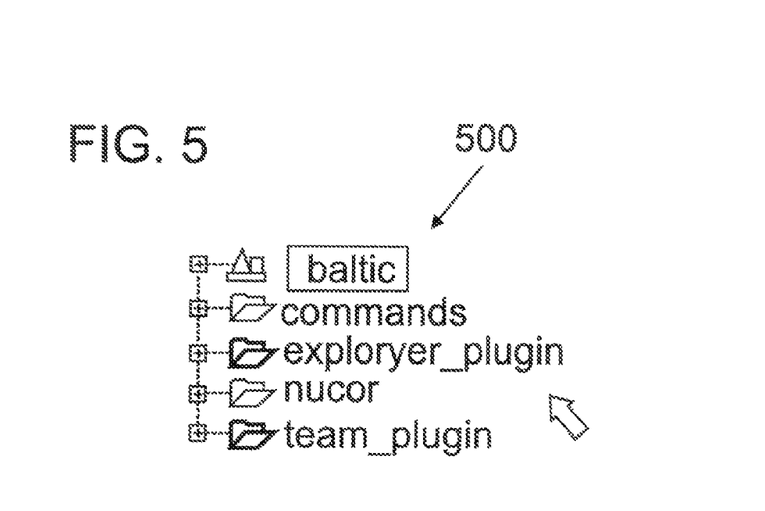
FIG. 5 illustrates a filtered hierarchy tree in accordance with exemplary embodiments.

FIG. 2 illustrates a file hierarchy tree 200 in which the user has selected any nodes in the tree 200 that the user would like to see in a filtered view in accordance with exemplary embodiments. In this example five nodes are selected. FIG. 3 illustrates the file hierarchy tree 200 of FIG. 2 in which the user has selected a "Filter . . . " command from a menu 300 in accordance with exemplary embodiments. FIG. 4 illustrates an exemplary popup dialog 400. In the popup dialog 400, the user can type in a name for the filter and hit "OK". FIG. 5 illustrates a filtered hierarchy tree 500 in accordance with exemplary embodiments. The tree 500 now shows only the nodes selected for the filter as root nodes. If necessary, context may be shown for the selection in an address bar or a hover bubble.

In exemplary embodiments, the user may select directly in their tree view to create the filter by pointing and clicking. Furthermore, the filter is named, persistent and reusable. In addition, the filter may be constructed using any nodes visible to the user in the tree.

Figure 6:
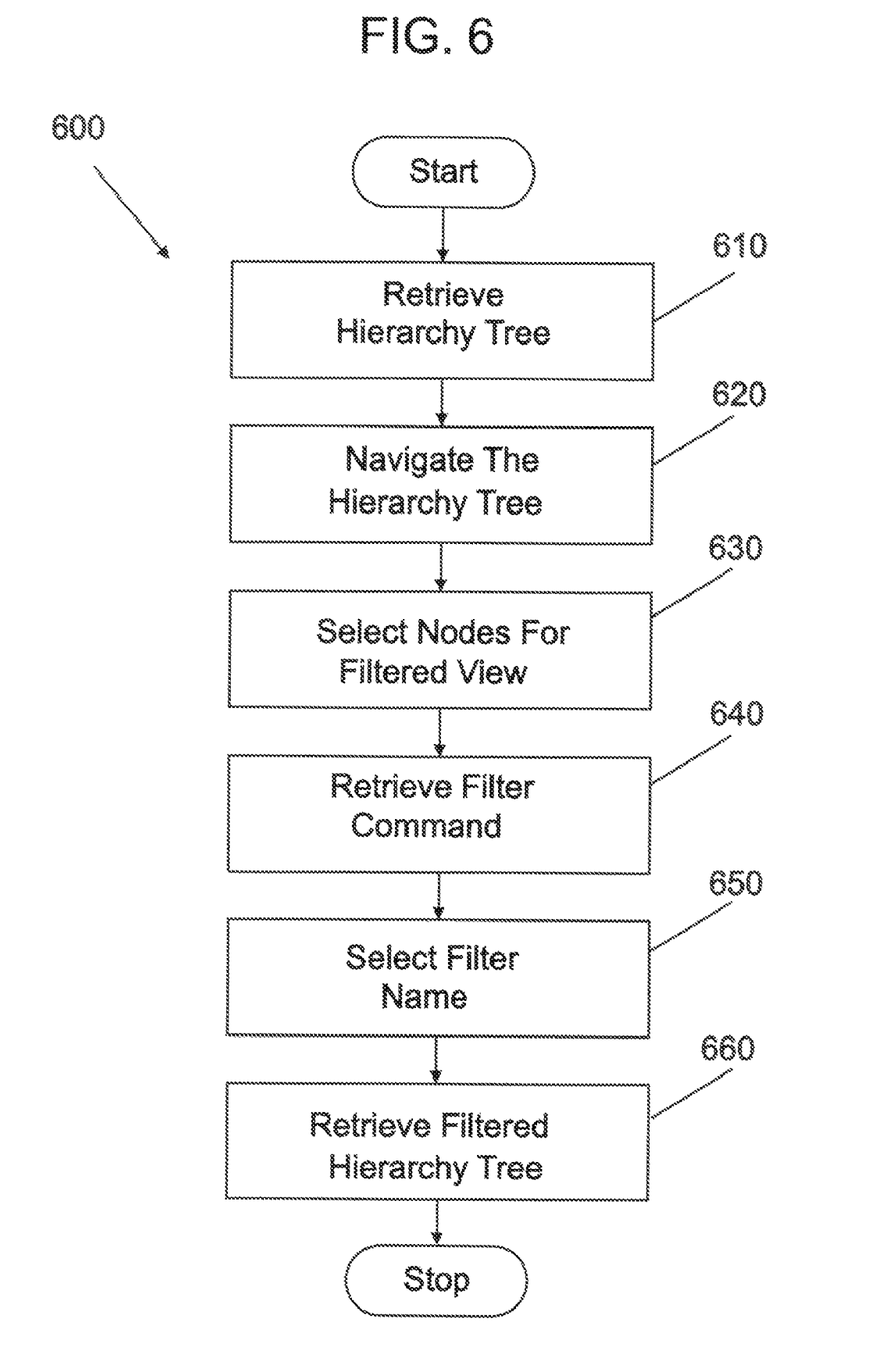
FIG. 6 illustrates a flowchart of a method for graphical user interface presentation to implement filtering of a large unbounded hierarchy to avoid repetitive navigation in accordance with exemplary embodiments.

FIG. 6 illustrates a flowchart of a method 600 for graphical user interface presentation to implement filtering of a large unbounded hierarchy to avoid repetitive navigation in accordance with exemplary embodiments. At block 610, the method 600 retrieves the file hierarchy tree having a series of nodes for presentation on the display 130. At block 620, the user can navigate the file hierarchy tree to identify nodes for selection in a sub-group of nodes. At block 630, the user selects the nodes for a filtered view. In exemplary embodiments, for each of the sub-group of nodes, the method 600 highlights each of the selected nodes on the display 130 as shown in FIG. 2. The user can then select a Filter command as shown in FIG. 3 at block 640. At block 650, the user can select a filter name, either by creating a new filter or editing an existing filter, in which case, the user can add or remove nodes for the filtered view. At block 660, the method 600 then displays the filtered hierarchy tree as shown in FIG. 5.

The exemplary embodiments of the graphical user interface presentation systems and methods described herein have been described with respect to file system presentations. It is appreciated that in other exemplary embodiments, the systems and methods described herein can present any hierarchal data represented in a tree.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow These claims should be construed to maintain the proper protection for the invention first described.

What is claimed is:

1. In a computer system having a graphical user interface including a display to present a file hierarchy tree and a selection device, a method of graphical user interface presentation to implement filtering of the file hierarchy tree, the method consisting of:

retrieving the file hierarchy tree for presentation on the display, the file hierarchy tree representative of a plurality of nodes, which are aligned in a plurality of lines;

navigating the file hierarchy tree to identify nodes for selection in a sub-group of nodes, wherein the sub-group of nodes includes a plurality of disparate nodes;

for each of the sub-group of nodes of the plurality of nodes:
  receiving a node selection signal indicative of the selection device pointing on a selected node from the file hierarchy tree;
  in response to the node selection signal, presenting the selected node with a highlight on the display;
receiving a menu selection signal indicative of the selection device pointing at one of the sub-group of nodes;
in response to the menu selection signal, displaying a menu on the display including an option to create a filter;
receiving a filter creation selection signal indicative of the selection device pointing at the option to create the filter;
in response to receiving the filter creation signal, displaying a popup dialog box on the display, the popup dialog box including an option to create a new filter and an option to edit an existing filter;
receiving a dialog box selection signal indicative of the selection device pointing at a selection button on the dialog box;
in response to the dialog box selection signal, displaying a filtered hierarchy tree on the display, the filtered hierarchy tree including the sub-group of nodes aligned in a single line,
wherein in response to the dialog box selection signal, receiving a new filter name when a create a new filter selection signal is received with the dialog box selection signal,
wherein in response to the dialog box selection signal, receiving an existing filter name, and the modified sub-group of nodes when an edit an existing filter selection signal is received with the dialog box selection signal, wherein the filtered hierarchy tree includes the sub-group of nodes that includes at least one of added nodes to the plurality of nodes and replacement nodes to at least one node of the plurality of nodes;
receiving a switch selection signal indicative of the selection device electing to switch between the file hierarchy tree and the filtered hierarchy tree on the display;
in response to the switch selection signal, switching between the file hierarchy tree and the filtered hierarchy tree on the display; and
saving at least one of the new filter and the existing filter that has been edited.

* * * * *